US010689886B2

(12) United States Patent
Mack

(10) Patent No.: US 10,689,886 B2
(45) Date of Patent: Jun. 23, 2020

(54) SECUREMENT DEVICE FOR USE IN VEHICLES

(71) Applicant: Hornady Manufacturing Company, Grand Island, NE (US)

(72) Inventor: Matthew Mack, Grand Island, NE (US)

(73) Assignee: Hornady Manufacturing Company, Grand Island, NE (US)

( * ) Notice: Subject to any disclaimer, the term of this patent is extended or adjusted under 35 U.S.C. 154(b) by 0 days.

(21) Appl. No.: 16/539,770

(22) Filed: Aug. 13, 2019

(65) Prior Publication Data

US 2020/0032558 A1 Jan. 30, 2020

Related U.S. Application Data

(63) Continuation-in-part of application No. 16/257,618, filed on Jan. 25, 2019, which is a continuation of application No. 15/936,697, filed on Mar. 27, 2018, now Pat. No. 10,190,339.

(60) Provisional application No. 62/576,113, filed on Oct. 24, 2017.

(51) Int. Cl.
| | |
|---|---|
| *B60R 11/00* | (2006.01) |
| *B60R 7/14* | (2006.01) |
| *E05B 73/00* | (2006.01) |
| *E05B 67/00* | (2006.01) |
| *F41C 33/06* | (2006.01) |

(52) U.S. Cl.
CPC ............ *E05B 73/0005* (2013.01); *B60R 7/14* (2013.01); *F41C 33/06* (2013.01); *B60R 11/00* (2013.01); *B60R 2011/005* (2013.01); *B60R 2011/0085* (2013.01); *B60R 2011/0096* (2013.01); *E05B 67/006* (2013.01)

(58) Field of Classification Search
CPC ....... B60R 2011/005; B60R 2011/0085; B60R 2011/0096; B60R 2011/0007; B60R 2011/0012; B60R 7/14
USPC ........................................ 224/556, 555, 275
See application file for complete search history.

(56) References Cited

U.S. PATENT DOCUMENTS

| | | | |
|---|---|---|---|
| 3,865,166 A | 2/1975 | Pedro | |
| 4,489,833 A | 12/1984 | Bauer | |
| 4,922,642 A | 5/1990 | Ohlhauser | |
| 5,845,885 A | 12/1998 | Carnevali | |
| 6,705,498 B2 | 3/2004 | Gantert | |
| 7,207,626 B2 | 4/2007 | Hassett | |
| 7,478,870 B2 | 1/2009 | Hassett et al. | |
| 8,162,189 B2 | 4/2012 | Robins | |
| 8,267,291 B2 | 9/2012 | Simon et al. | |
| 8,342,324 B2 | 1/2013 | Debias | |
| 9,530,266 B2 | 12/2016 | Delattre et al. | |
| 9,598,021 B2 | 3/2017 | Noonan | |
| D786,047 S * | 5/2017 | Mack | ............................. D8/330 |
| 10,190,339 B1 * | 1/2019 | Mack | ..................... F41C 33/06 |
| 10,233,687 B2 * | 3/2019 | Delattre | ................. E05G 1/005 |
| 10,259,370 B2 * | 4/2019 | Filipovich | ............... B60R 11/00 |
| 2009/0108169 A1 | 4/2009 | Gough | |
| 2010/0270201 A1 | 10/2010 | Cauley et al. | |

(Continued)

*Primary Examiner* — Justin M Larson
(74) *Attorney, Agent, or Firm* — McHale & Slavin, P.A.

(57) ABSTRACT

A securement device for use in a vehicle. The device includes a retainer for holding or storing an object such as a firearm. The device utilizes an inflatable pillow to hold the device in position in the vehicle. It also includes an attachment that couples to the retainer and allows for adjustment of the orientation of the retainer.

12 Claims, 12 Drawing Sheets

(56) References Cited

U.S. PATENT DOCUMENTS

| | | | |
|---|---|---|---|
| 2017/0046899 A1* | 2/2017 | Delattre | ................. E05G 1/005 |
| 2017/0050575 A1 | 2/2017 | Dara | |
| 2017/0267188 A1 | 9/2017 | Wilkinson | |
| 2018/0372446 A1* | 12/2018 | Mack | ................. E05B 73/0005 |
| 2019/0352940 A1* | 11/2019 | Mack | ..................... F41C 33/06 |

* cited by examiner

SECUREMENT DEVICE FOR USE IN VEHICLES

PRIORITY CLAIM

In accordance with 37 C.F.R. 1.76, a claim of priority is included in an Application Data Sheet filed concurrently herewith. Accordingly, the present invention claims priority as a continuation-in-part to U.S. patent application Ser. No. 16/257,618, entitled "SECUREMENT DEVICE FOR USE IN VEHICLES", filed Jan. 25, 2019, which is a continuation to U.S. patent application Ser. No. 15/936,697, entitled "SECUREMENT DEVICE FOR USE IN VEHICLES", filed Mar. 27, 2018, now U.S. Pat. No. 10,190,339, issued Jan. 29, 2019, which claims priority to U.S. Provisional Patent Application No. 62/576,113, entitled "SECUREMENT DEVICE FOR USE IN VEHICLES", filed Oct. 24, 2017. The contents of the above referenced applications are incorporated herein by reference.

FIELD OF THE INVENTION

A securement device particularly adapted for use in a vehicle. The device is configured to releasably retain an object associated with the device in a predetermined location and position in the vehicle.

BACKGROUND OF THE INVENTION

Devices such as gun safes for use in vehicles are well known in the art. They typically include a mounting device for permanent securement to the vehicle, for example, under the dashboard or under a seat. They will also typically include some type of retainer mechanism that will releasably retain a firearm, such as a pistol, to the mounting device. Such devices may also offer means for ejecting the retained firearm upon either a manual operation or electronic signal. Once the device is secured to the vehicle, it is typically a permanent securement of the device and does not allow for its repositioning or removal without significant effort. In addition, such devices are limited to the storage and securement of a single type of item. Also, because of the construction of the mounting device, the orientation of the retained item relative to a person in the vehicle is very limited. There is thus a need for an improved securement device for use in vehicles.

DESCRIPTION OF THE PRIOR ART

An example of a vehicle gun safe can be found in U.S. Publication No. 2018/0073836, to Romeo et al. The disclosure of this application is incorporated in its entirety herein by reference.

SUMMARY OF THE INVENTION

The present invention provides a securement device particularly adapted for use in a vehicle, such as a car, SUV or truck, and is configured to retain an object, such as a pistol, at a predetermined orientation and location in the vehicle.

Accordingly, it is a primary objective of the instant invention to provide such a securement device, wherein the predetermined orientation is adjustable.

It is a further objective of the instant invention to provide such a securement device that allows for both rotational and elevational position adjustment.

It is a further objective of the instant invention to provide such a securement device that allows toolless adjustment of the rotational and elevational position.

It is a further objective of the instant invention to provide a securement device that may be easily located and releasably mounted at various positions in a vehicle.

It is yet another objective of the instant invention to provide such a securement device with means to secure it against removal from the vehicle within which it is mounted.

It is a still further objective of the invention to provide such a securement device that may be utilized with various types of object retainers.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
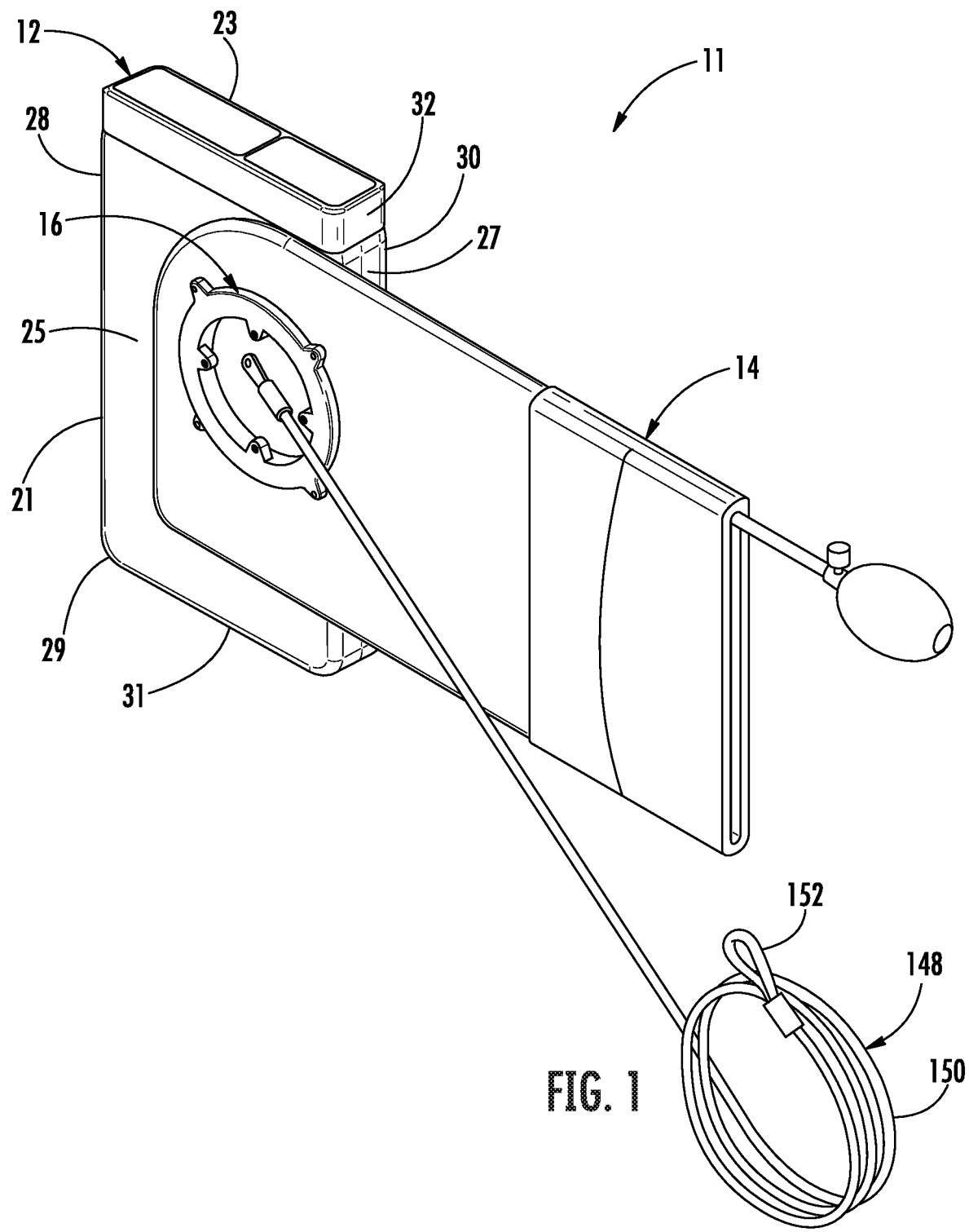
FIG. 1 is a perspective view of a securement device with one type of object retainer.

The reference numeral 11 represents, generally, a securement device for use in vehicles (not shown) such as trucks, cars and SUVs. The securement device 11 is operable to mount a retainer, designated generally 12, within the vehicle to allow it to be positioned at various orientations and various locations within the vehicle, and to allow for its easy removal by an authorized person. The securement device 11 includes a mounting device 14 that can be coupled to the retainer 12, which allows mounting of the securement device within the vehicle in a releasable manner. The securement device 11 also includes an attachment device 16 coupled to the retainer 12 and operable to effect attachment of the retainer in a semi-permanent and preferably theft resistant manner to the vehicle. The attachment device 16 is operable to mount the retainer 12 to the mounting device 14 and allow for adjusting the orientation of the retainer 12 to both the mounting device 14 and the vehicle.

Figure 2:
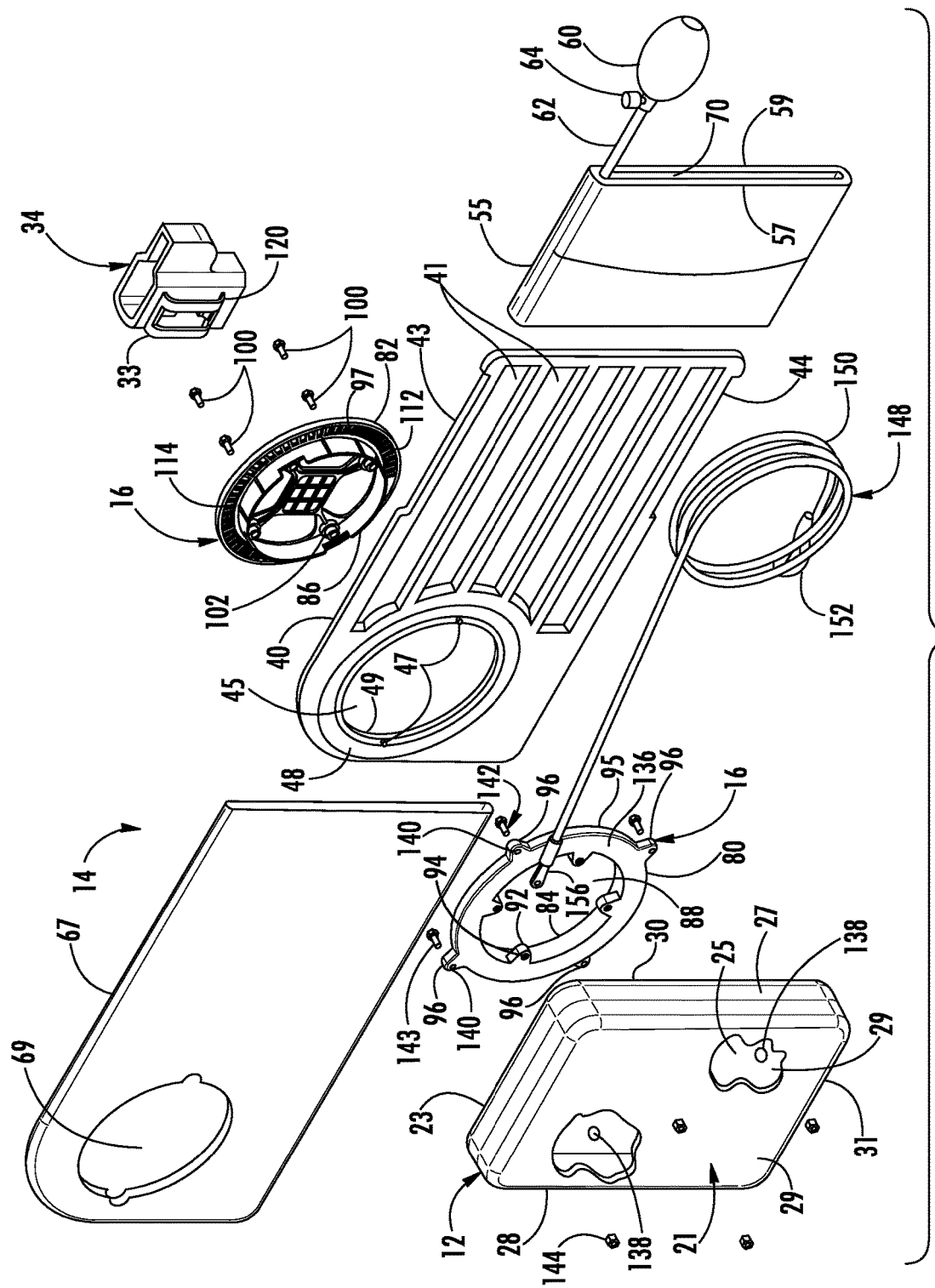
FIG. 2 is an exploded perspective view of the securement device including two types of object retainers.

The retainer 12 can be any suitable device. As shown in FIG. 1, the retainer 12 is in the form of a gun safe having a storage container 21 and a selectively openable door, cover or lid 23. Such a device is disclosed in U.S. Pat. No. 9,530,266 to Delattre et al., and U.S. Publication No. 2017/0046899 to Delattre et al. Opening may be effected either manually or electronically, and can include a lock mechanism (not shown) to selectively keep the cover 23 in a locked condition. The container 21 includes an enclosed internal storage chamber 25 in which a firearm or other valuable can be stored and out of sight. As shown, the container 21 has end walls 27 and 28, sidewalls 29 and 30, a bottom wall 31, and an open top 32. The lid or cover 23 closes the open top 32. Alternately, or in addition to the container 21, the retainer 12 can be in the form of a holster, designated generally 34. As seen in FIG. 2, the holster 34 can be provided with a spring-type belt clip 33 for a purpose described below. Such holsters are well known in the art wherein the storage chamber is not enclosed, i.e. open to the exterior.

The securement device 11 includes the mounting device 14 that is operable to effect a mounting of the securement device 11 within a vehicle as described herein. As best seen in FIG. 2, the mounting device 14 includes a mounting plate 40. The mounting plate 40 is preferably generally planar and is made of a rigid material, such as molded plastic or metal alloy. The mounting plate 40 can be provided with a series of openings 41 to reduce weight and material used. As shown, the mounting plate 40 is generally rectangular and can have rounded corners at the junctions between the side and end edges. Notches 43, 44 are provided in each of the top and bottom edges, respectively, for a purpose described below. The mounting plate 40 is also provided with a through aperture 45 that is preferably positioned adjacent one of the ends of the mounting plate 40. Preferably, the aperture 45 is generally round. Position fixing pins 47 are provided adjacent the edge of the aperture 45 and project from opposite side faces 48, 49 of the mounting plate 40. The pins 47 can be molded as an integral part of the mounting plate 40 or can be affixed to the mounting plate 40 through openings therethrough. The pins 47 can be made of metal and be releasably secured to the mounting plate 40.

As best seen in FIG. 2, the mounting device 14 includes an inflatable pillow 55. The inflatable pillow 55 is preferably in the form of a sleeve that fits over the mounting plate 40, and is received in the notches 43, 44 to fix its position relative to the mounting plate 40. In a preferred embodiment, the pillow 55 has two inflatable sides 57 and 59, with one being positioned on each of the opposite sides of the mounting plate 40. A pump device 60, such as a flexible bulb, is connected in flow communication with the pillow 55 via a tube 62 that allows a fluid to flow between the pump 60 and the pillow 55. The pump 60 may be made of a polymeric material such as a thermoplastic or elastomeric material. Such pumps are well known in the art and are used to inflate blood pressure cuffs. A valve 64 is connected in flow communication between the pump 60 and the pillow 55. The valve 64 is used to seal pressurized fluid within the pillow 55 and allow the pressurized fluid to escape in a selective manner. The pump 60 can be provided with a pair of check valves (not shown), with a first check valve allowing fluid to flow into the pump 60 during a pump filling stroke, while the second check valve prevents fluid flow out of the pillow 55 during the filling stroke. The first check valve prevents flow out of the pump 60, and the second check valve allows fluid flow to the pillow 55 during a pressurizing stroke of the pump 60 to effect inflation of the pillow 55. The valve 64 is closed during inflation of the pillow 55 and opened to bleed fluid from the pillow 55 for deflation of the pillow 55. In a preferred embodiment, the fluid used to inflate the pillow 55 by pumping is air. In use, the retainer 12 is placed in a vehicle in an area that has a wall or panel on each side of the retainer; for example, between the side of a seat and a side of the center console of the vehicle. By inflating the pillow 55, the retainer 12 and the mounting device 14 are held in a location in the vehicle in a releasable manner. The mounting plate 40 can be provided with a cover 67 that will enclose the mounting plate 40 and the pillow 55. The use of a cover 67 can provide additional friction and prevent marring of the walls or panels between which the mounting plate 40 is positioned. As shown, the cover 67 is provided with a through opening 69 that corresponds in position to the through aperture 45 for a purpose described below. The pillow 55 can be made of a coated fabric that is air impermeable. It is to be understood additionally that the pillow 55 can be self-inflating or partially self-inflating by having an open cell foam contained in the air pocket inside the pillow 55, with the final inflation being effected by the pump 60.

In a preferred embodiment, the pillow 55 principally expands laterally outwardly when inflated, from at least one of the side faces 48, 49, and preferably both side faces of the mounting plate 40. The pillow 55 is also retained against movement relative to the mounting plate 40 by the end edges of the notches 43, 44. The inner sleeve 70 of the pillow 55 can be made of a material that resists stretching during inflation of the pillow 55 to help hold the pillow 55 in place in the notches 43, 44. Other means can be provided in addition to or in place of the end edges of the notches 43, 44 to retain the pillow 55 against movement relative to the mounting plate 40 during use. For example, the pillow 55 could be adhesively secured to the mounting plate 40, or removably held in place by hook and loop fastener devices, etc.

The attachment device 16 and its components are best seen in FIGS. 2-4D. The attachment device 16 is operable for securing a retainer 12 to the mounting plate 40 in a removable manner and allowing for different types of retainers 12 to be secured to the mounting plate 40. In a preferred embodiment, the attachment device 16 is secured to the mounting plate 40, and is configured to permit the retainer 12 to be positioned at various preselected orientations as desired by the user in an indexable manner. As shown in FIG. 2, the attachment device 16 has a first rim 80 and a second rim 82. Both rims 80, 82 are shown as having a generally circular outer perimeter, although other shapes could be used if desired. Additionally, both rims 80, 82 have a generally circular laterally projecting locator flange 84 and 86, respectively, that fit within the aperture 45 to assist in securing the attachment device 16 to the mounting plate 40. The outer perimeter of the flange 84 is sized approximately the same as the perimeter of the aperture 45, while the outer perimeter of the flange 86 is sized to fit within the flange 84 and extend through its opening 88. As shown, the flange 86 has a plurality of notches 90; each positioned and sized to receive therein a respective ear 92 of rim 80 projecting radially inwardly into the opening 88. As shown, each of the ears 92 has a through aperture 94 for a purpose later described. The attachment device rim 80 is also provided with a plurality of radially outwardly projecting tabs 96; each having a through aperture 98 used for a purpose later described. The attachment device rim 82 is configured to be secured to the rim 80, and thereby secure the attachment device 16 to the mounting plate 40 and be positioned within the aperture 45. As seen in FIG. 2, the rim 82 is secured to the rim 80, as with threaded fasteners 100 that each extend through a respective through aperture 102 and are threadably received in threaded apertures 94 in the ears 92 on rim 80. Tightening of the fasteners 100 clamps the mounting plate 40 between clamp flange portions 95, 97 of the rims 80, 82, respectively.

The rims 80, 82 can be secured to the mounting plate 40 in a manner that allows orientation of the attachment device 16 to be selected and locate the retainer 12 in a selected rotational orientation as desired. As shown, each of the rims 80, 82 has an inner face 110 and 112 respectively. The inner faces 110, 112 each have a plurality of recesses 114 formed therein and positioned about the perimeter of each of the faces 110, 112. The recesses 114 are configured to receive therein a pin 47, which will fix the rotational position of the attachment device 16 relative to the mounting plate 40 when the rims 80, 82 are secured to the mounting plate 40. Any suitable number of recesses 114 can be provided. The recesses 114 extend outwardly and preferably generally radially outwardly. Indexing can also be accomplished by other means, such as the aperture 45 having a toothed surface defining the aperture with the plurality of teeth projecting radially inwardly and the locator flange 84 having corresponding teeth projecting radially outwardly and meshing with the teeth forming the aperture 45.

Figure 3A:
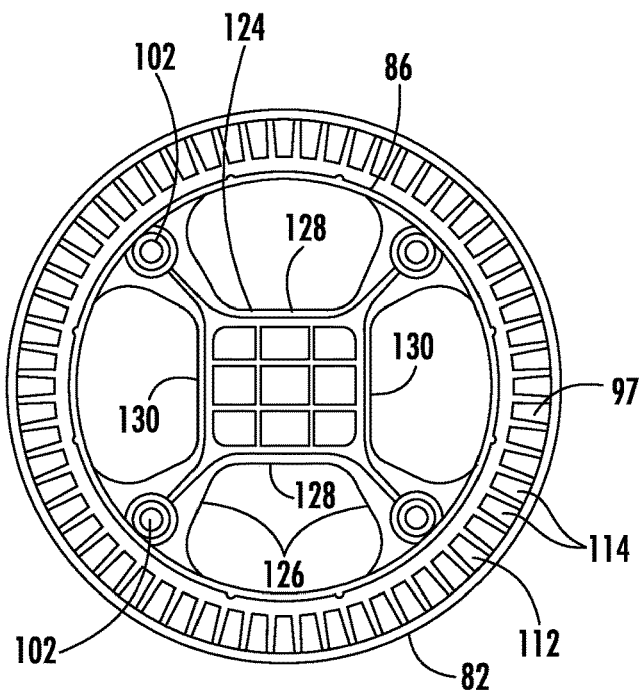
FIGS. 3A-3D include enlarged perspective views, a side elevation view, and a front elevation view of a first portion of a retainer mounting device.
Figure 3B:
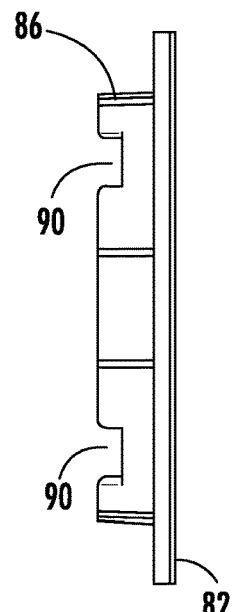
Figure 3C:
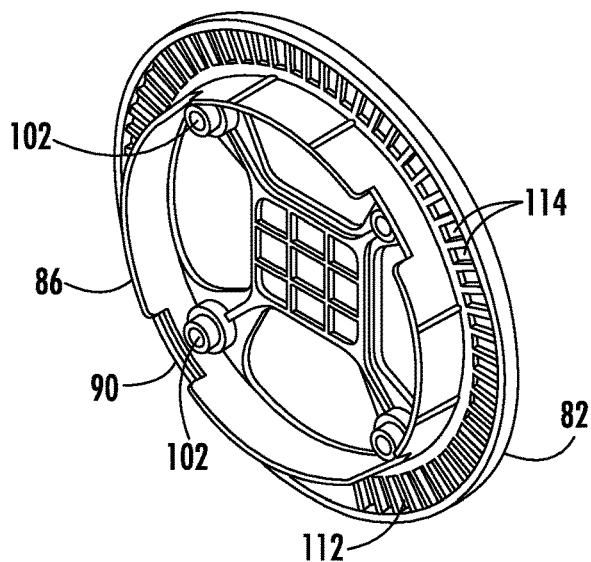
Figure 3D:
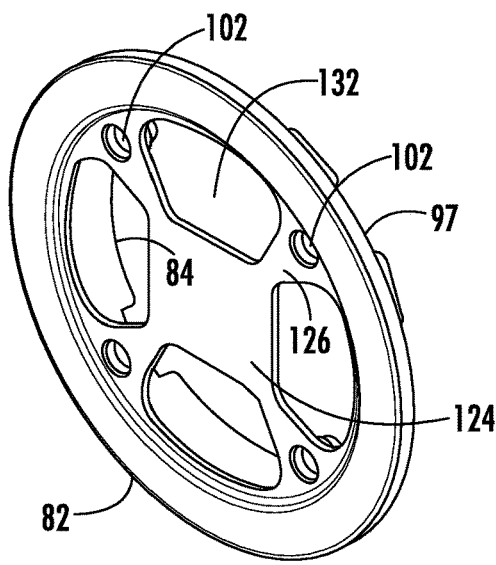
Figure 4A:
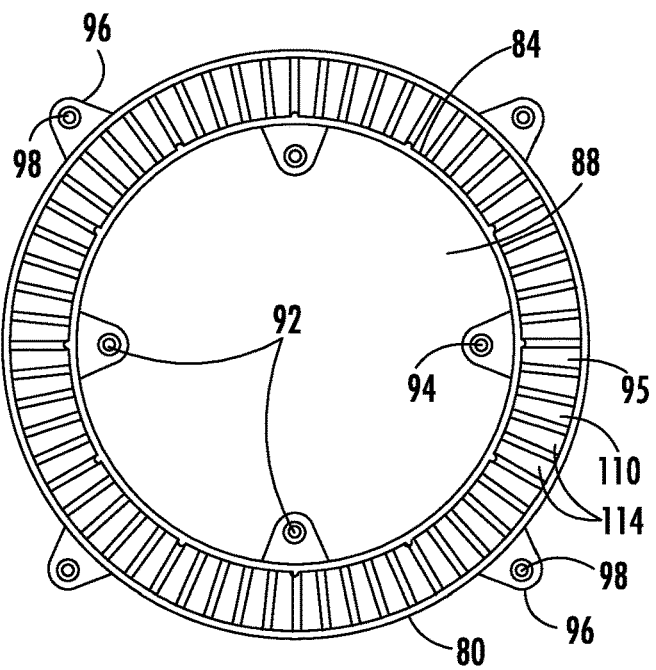
FIGS. 4A-4D include enlarged perspectives views, a side elevation view, and a front elevation view of a second portion of a retainer mounting device.
Figure 4B:
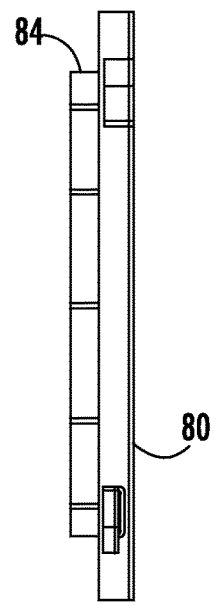
Figure 4C:
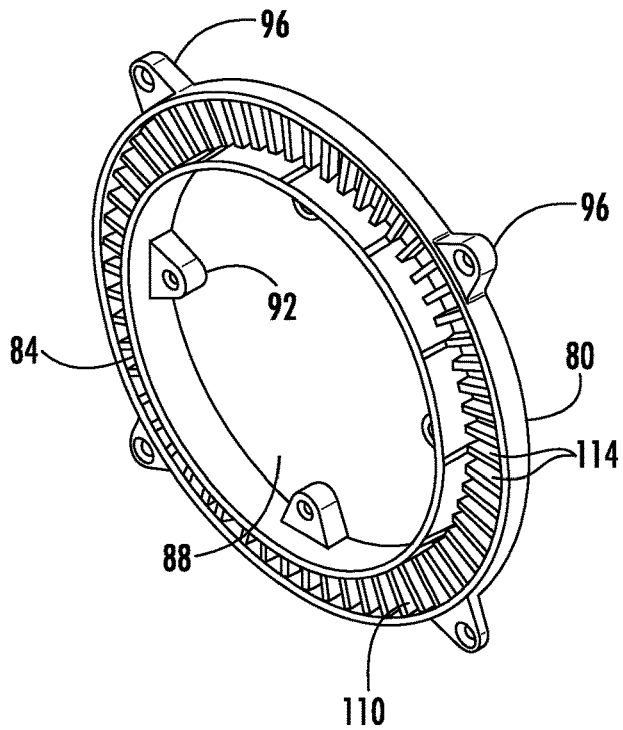
Figure 4D:
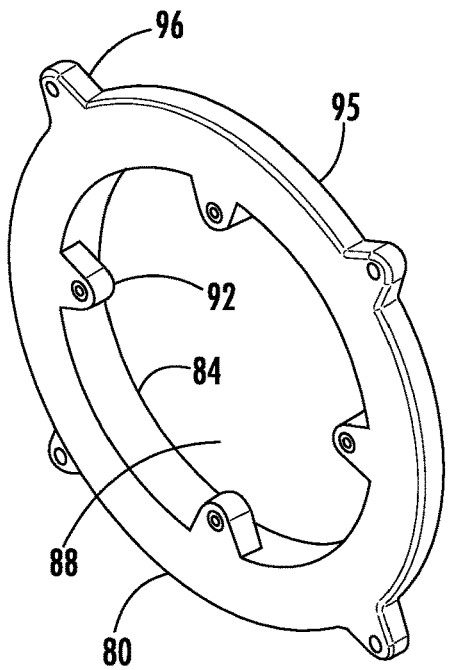

The attachment device 16, as mentioned above, is adapted for attaching a retainer 12 to the mounting plate 40. One form of retainer 12 is a holster, designated generally 34, and as seen in FIG. 2. Such holsters typically have means, such as a belt clip, for carrying the holster mounted to a belt on a person. In the form of holster 34 shown, the belt clip 33 is in the form of a metal hook providing a space between one wall of the holster and an inner portion of the belt clip 33 in which a belt would typically be received. A hook 120 is typically provided on the belt clip 33 to prevent the holster 34 from accidentally becoming separated from the belt on which it is mounted. As best seen in FIGS. 3A-3D, the rim 82 is provided with a hub 124, generally centrally positioned within the rim 82. The hub 124 is connected to the remainder of the rim 82 as, for example, by radially outwardly projecting spokes 126. As illustrated, the hub 124 is generally rectangular, having four sides providing two pairs of generally parallel side edges 128, 130. In a preferred embodiment, the side edges 128 are longer than the side edges 130 to accommodate different heights of belt clips 33. For example, the edges 130 can be adapted to receive a 1 inch belt clip 33, while the side edges 128 can be used to accommodate a 1½ inch belt clip. As seen in FIG. 3D, the hub 124 is dished outwardly of the remainder of the rim 82 to allow the belt clip 33 to be positioned through the openings 132 positioned between the spokes 126.

The retainer 12, which is in the form of a rectangular box, can be suitably mounted to the attachment device 16 through use of the rim 80. As seen in FIG. 2, the inner surface of the sidewall 30 is positioned adjacent to an outer face 136 of the rim 80. The sidewall 30 is provided with apertures 138 corresponding in number and position to apertures 140 through the tabs 96. Mechanical fasteners 142 that are preferably non-permanent in nature, such as threaded bolts 143 and nuts 144, are utilized for removable attachment. The bolts 143 extend through the apertures 138, 140 and are fastened in place with a respective nut 144. It is to be understood that while the nuts 144 are shown as separate parts, they could be made an integral part of the sidewall 30. In the illustrated embodiment, the container 21 is secured to the rim 80 prior to the rim 80 being secured to the mounting plate 40 along with the rim 82.

As seen in FIGS. 1 and 2, the securement device 11 is provided with an anti-theft attachment device designated generally 148. The device 148 is operable to attach the securement device 11 to the vehicle to resist its unauthorized removal from the vehicle while permitting flexibility in positioning the retainer 12 in the vehicle. As shown, the device 148 is in the form of a flexible tether, such as a coated metal cable 150. The cable 150 has a loop 152 on a distal end. A padlock or the like (not shown), can be used to removably secure the cable 150 to the vehicle, for example to a seat support. A proximal end of the cable 150 is secured to the mounting plate 40, attachment device 16 and/or retainer 12. As shown, the cable 150 is provided with an eyelet 156 configured to receive a bolt 143 therethrough, with the eyelet 156 being captured on the bolt between the retainer 12 and the rim 80. A recess (not shown) can be provided in the sidewall 30 to receive the eyelet 156 for a flush mounting.

FIGS. 5-9 illustrate a second embodiment of the present invention. The reference numeral 211 represents, generally, a second embodiment of the securement device for use in vehicles (not shown) such as trucks, cars and SUVs. The securement device 211 is operable to mount a retainer, such as a firearm retainer, designated generally 12, within the vehicle, to allow it to be positioned at various orientations and various locations within the vehicle, and to allow for its easy removal by an authorized person. The firearm retainer 12 is generally described above. The securement device 211 includes a mounting device 214 that can be coupled to the retainer 12, to allow mounting of the securement device within the vehicle in a releasable manner. Except as noted below, the mounting device 214 is generally similar to the mounting device 14 described above. The securement device 211 also includes an attachment device 216 coupled to the retainer 12 and operable to help effect attachment of the retainer 12 in a semi-permanent and preferably theft resistant manner to the vehicle. The attachment device 216 is operable to mount the retainer 12 to the mounting device 214 and allow for adjusting the orientation of the retainer 12 to both the mounting device 214 and the vehicle as described herein. The securement device 211 includes both the mounting device 214 and attachment device 216.

Figure 7:
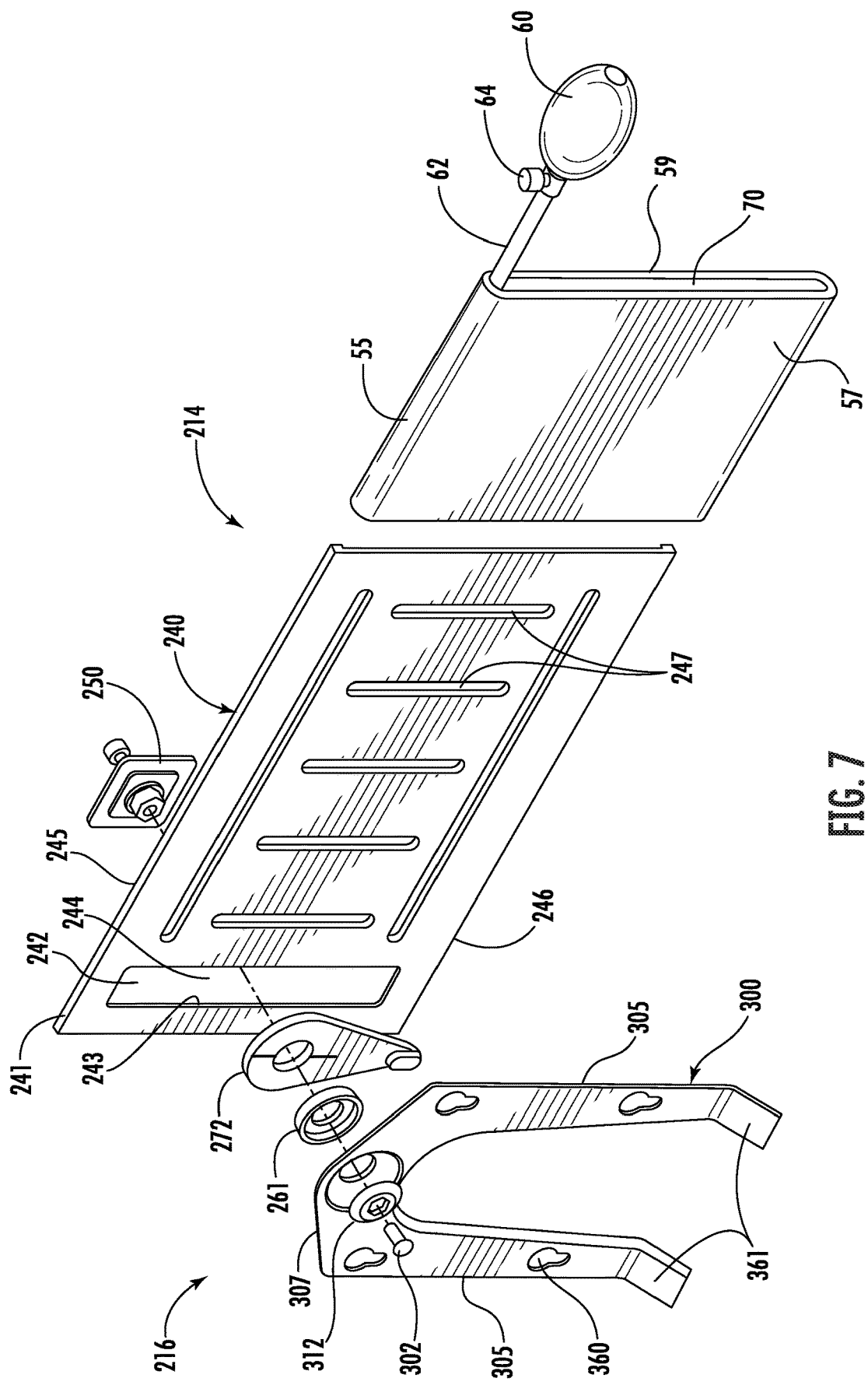
FIG. 7 is an exploded perspective view of a portion of the securement device showing details of the mounting device, pillow and mounting plate.

The mounting device 214 includes a pillow 55, tube 62, valve 64, and pump 60 as described above. The pillow 55 preferably includes inflatable sides 57, 59. The pillow 55 and its associated parts, as described below, are generally as described above. While the pillow 55 is shown as having two inflatable sides 57, 59, it is to be understood that a single inflatable side can be used. As best seen in FIG. 7, the inflatable sides 57, 59 are part of a sleeve 70 that is received over a mounting plate 240, which is preferably rigid. A cover 67, as described above, can also be provided for protection of the mounting plate 240 and the surrounding portions of a car or vehicle interior. It is to be noted that the mounting plate 240 is received within the sleeve 70 and can have its longitudinal position relative to the pillow 55 adjustable and held in place by air pressure when the pillow 55 is inflated. This provides a first positional adjustment for the retainer 12. The mounting plate 240 has a free and exposed end portion 241. The mounting plate 240 also has a through elongate slot 242 that is at least partially defined by a pair of generally parallel side edges 243, 244 for a purpose described below. The elongate slot 242 extends in a direction between an upper edge 245 and a lower edge 246 of the mounting plate 240. The mounting plate 240 can be provided with a plurality of spaced apart ribs or grooves 247 to help retain the pillow 55 in a selected longitudinal position relative to the mounting plate 240.

Figure 8:
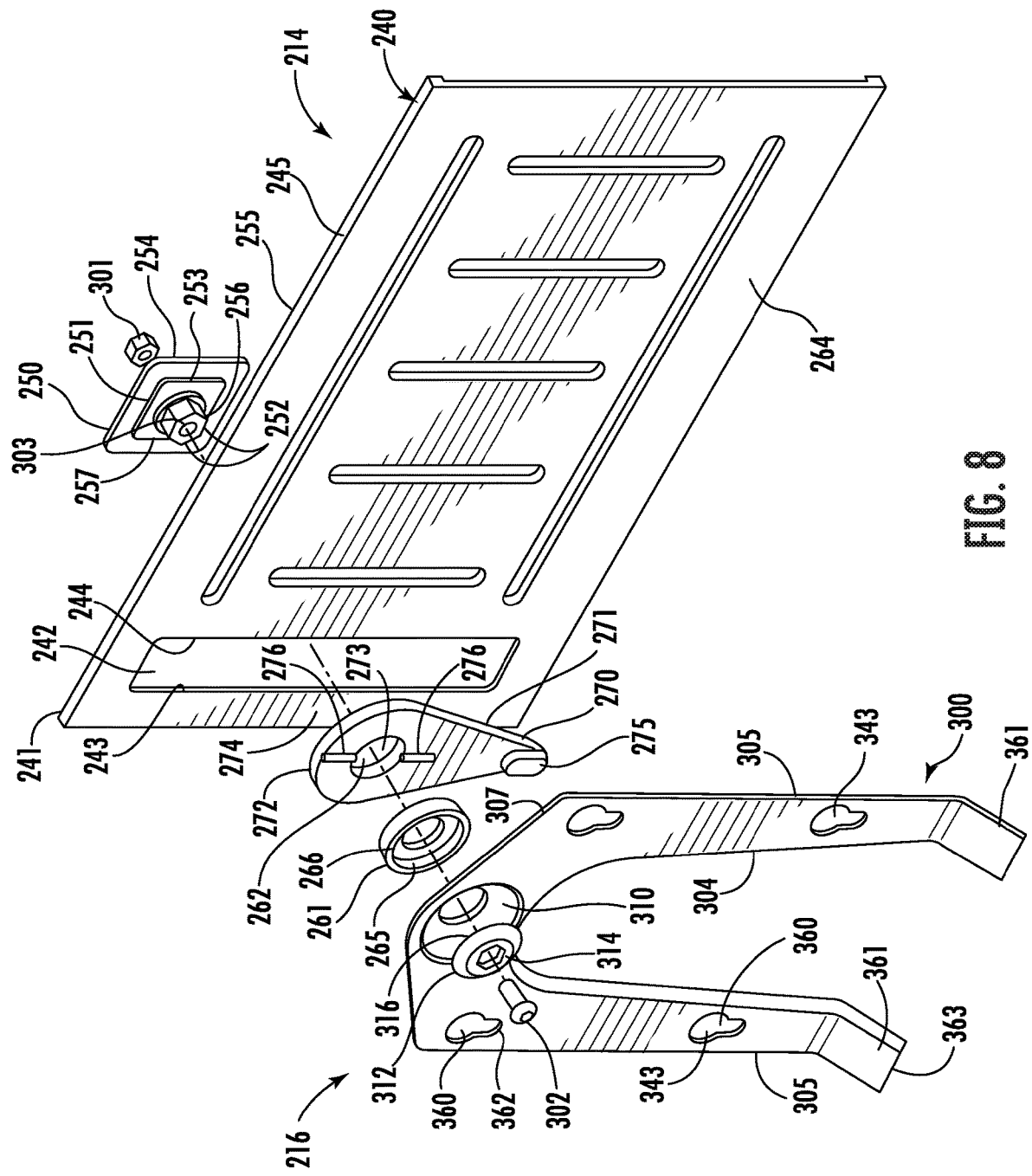
FIG. 8 is an enlarged, exploded perspective view of portions of the mounting system that allows for rotational and elevational positioning of the firearm retainer.

Details of the attachment device 216 are shown in FIG. 8. The attachment device 216 is operable to allow mounting of the retainer 12 to the mounting device 214 in a manner that allows for both selective rotational movement and elevational movement of the retainer 12 relative to the mounting device 214, and hence the vehicle in which it is mounted, and releasably fix the retainer 12 in a desired elevational position and rotational orientation. As shown, the attachment device 216 includes a slide 250 positioned on a first side of the mounting plate 240. The slide 250 includes a follower portion 251 that is received within the slot 242 for guiding and restricting its movement. The follower 251 has a pair of raised side edges 252, 253 that are received within the slot 242 and are positioned for engagement with the side edges 243, 244 to preferably prevent the rotation of the slide 250 within the slot 242, both during movement of the slide 250 and when releasably retained in a selected position relative to the mounting plate 240. The slide 250 is provided with a flange 254 that engages a side face portion 255 of the mounting plate 240 to prevent it from passing through the slot 242 during use. The slide 250 is also provided with a protuberance 256 that extends beyond the opposite face 264 from the face 255 of the mounting plate 240 on which it is mounted. The protuberance 256 is provided with means to prevent its rotation relative to a tightening element designated generally 261. The tightening element 261 operates axially with the slide 250 and actuator 270, described below, to releasably fix the slide against movement relative to the mounting plate 240. As shown, the protuberance 256 has at least one flat 252, and preferably a plurality of flats as seen in FIG. 8. As shown, the protuberance 256 has a hex configuration, although any other suitable configuration with a plurality of flats can be provided, such as square, triangular and the like, to form a spline connection with other parts as described below.

Figure 9:
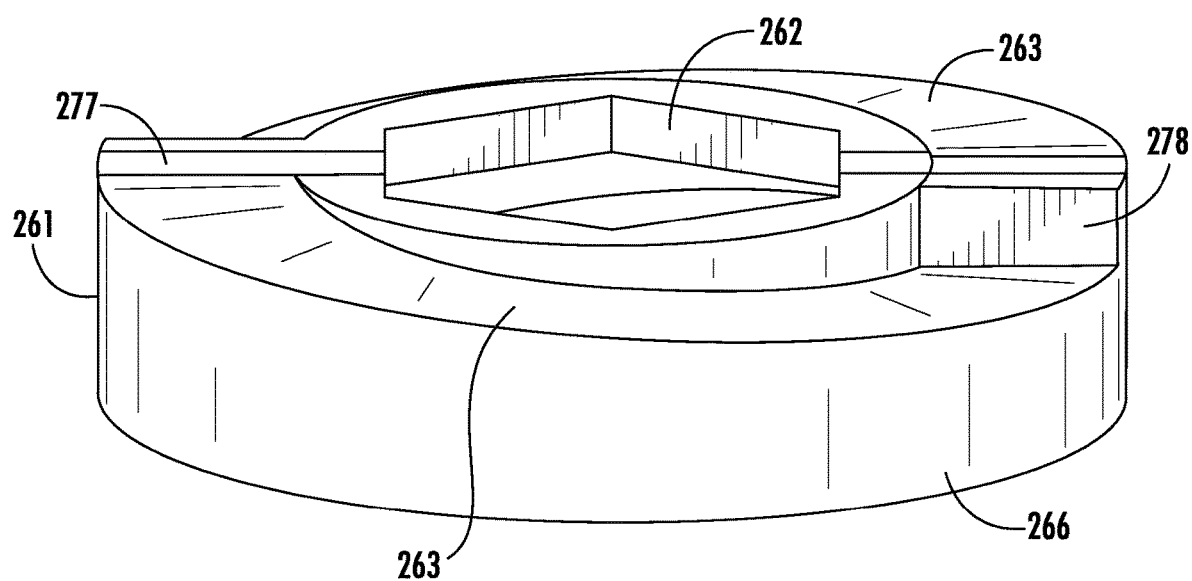
FIG. 9 is an enlarged perspective view of a cam device usable to releasably retain the firearm retainer in a desired position relative to the mounting plate.

The attachment device 216 includes the tightening element 261, as seen in FIG. 8. A detailed depiction of the tightening element 261 is seen in FIG. 9. The tightening element has a female opening 262 adapted and shaped for receiving the protuberance 256 therein, thus preventing rotation of the tightening element 261 relative to the slide 250. It is to be understood that the slide 250 could be provided with the female opening 262 and the tightening element 261 could be provided with the protuberance 256. As shown, the opening 262 is hex shaped, as is the protuberance 256, forming a spline connection. The tightening element 261 is provided with at least one inclined surface portion 263 positioned radially outwardly from the opening 262 and facing a face portion 264 of the mounting plate 240, which is opposite of the face 255. As shown, there are two inclined surface portions 263 which function as camming surfaces. The incline of the surface portions 263 incline circumferentially. As best seen in FIG. 8, the tightening element 261 has a recess 265 forming a cup opposite the surface portions 263. The recess 265 is defined by an upstanding wall 266 that extends circumferentially about the tightening element 261.

The attachment device 216 includes a tightening actuator 270 that is best seen in FIG. 8. The attachment device 216 is configured for an operator to selectively move and, as shown, move in a rotational manner to effect releasable tightening of the attachment device 216 to the mounting plate 240 to fix the position of the attachment device 216 relative to the mounting plate 240, and hence the position of the retainer 12. The tightening element 261 and the actuator 270, through coaction, effect operation of the attachment device to selectively releasably secure the coupler 300, described below, in a selected position and orientation. The actuator 270 is shown as having an arm 271 extending from a hub 272. The hub 272 is provided with a through opening 273 to receive therethrough the protuberance 256, so that the protuberance can engage the tightening element 261. The through opening 273 is sized and shaped to allow free rotation of the actuator 270 about the protuberance 256, which functions as a shaft for the actuator 270. The hub 272 has a friction braking surface 274 that engages the face 264 of the mounting plate 240. The hub 272 is also provided with, in a preferred embodiment, a pair of cam followers 276 projecting from the face opposite the brake surface 274. As shown, the cam followers 276 are in the form of projecting ribs, each engageable with a respective camming surface 263, whereby rotation of the actuator 270 relative to the tightening element 261 and slide 250 increases the friction between the mounting plate 240 and the actuator 270 to releasably lock the attachment device 216 in an elevation position relative to the mounting plate 240. The camming surfaces 263 can terminate in ledges 277, 278, that can limit rotation of the actuator 270 by engagement with the followers 276. As shown, the attachment device 216 can be moved both along the slot 242 and rotationally relative to the mounting plate 240. In a preferred embodiment, and in use, the attachment device 216 is movable such that a lower portion can engage the floor of the vehicle to provide extra vertical support for the firearm retainer 12, as described below. The actuator 270 also includes a ledge forming member 275 to facilitate movement of the actuator 270 by an operator.

The attachment device 216 also includes a coupler 300. The coupler 300 is mounted to the slide 250 via a suitable fastener 302, such as a machine screw, that extends through a hole 303 through the protuberance 256, the opening 262, the opening 273 and the slot 242, and held in assembly by a second threaded fastener 301, such as a locking nut like an elastic locknut. The fastener 301 is preferably positioned in a recess 306 (FIG. 6) opening on the outside of the slide 250. The recess 306 can be shaped like the exterior of the fastener 301 to prevent relative rotation. A suitable shape for both is a hex. The tightening element 261 and actuator 270 are positioned between the coupler 300 and the mounting plate 240 when the attachment device 216 is assembled. The coupler 300 is configured to mount the firearm retainer 12 to the mounting plate 240. The mounting can be permanent or removable as desired. As shown, the mounting is removable. The coupler 300 includes a plate 304 that can be generally U-shaped having a pair of spaced apart legs 305 and bight 307 connected to and extending between the legs 305. Preferably the legs 305 and bight 307 are an integral structure and can be made of stamped metal or molded of a polymeric material. The bight 307 has a portion engaging the tightening element 261 to effect frictional brake engagement therebetween. In the illustrated structure, the bight 307 includes a projecting male ball joint portion 308 that is received within the recess 265, engaging the wall 266, allowing both rotation and pivoting of the coupler 300 relative to the mounting plate 240. Preferably, the ball joint portion 308 has a generally spherical exposed surface 309 (FIG. 6) to engage in the wall 266. A female ball joint portion 310 is provided on the opposite side of the coupler 300. A ball joint friction element 312 is provided and is coupled to the slide 250 and fixed against relative rotation by having a through bore 314 that couples to the protuberance 256. The through bore 314 has a shape similar to that of the protuberance 256 to prevent relative rotation when axial force is applied by action of the actuator 270. As shown, the through bore 314 has a hex shape. The friction element 312 has a friction brake surface 316 that is configured and positioned to engage the surface of the ball joint portion 310. In a preferred embodiment, the surface of the ball joint portion 310 and the friction brake surface 316 are generally spherical, which allows both rotation and pivoting movement of the coupler 300 relative to the mounting plate 240 to cant the retainer 12 and provide another axis of movement, providing multi axis movement. The coupler 300 is secured to the remaining portions of the attachment device 216 via a threaded fastener 302. The slide 250, actuator 270, tightening element 261, friction element 312 and ball joint portion 310 form a generally linear stack, albeit disposed generally horizontally in use, which is axially loaded by force through coaction of the actuator 270 with the tightening element 261 to place tension on the fastener 302.

Figure 5:
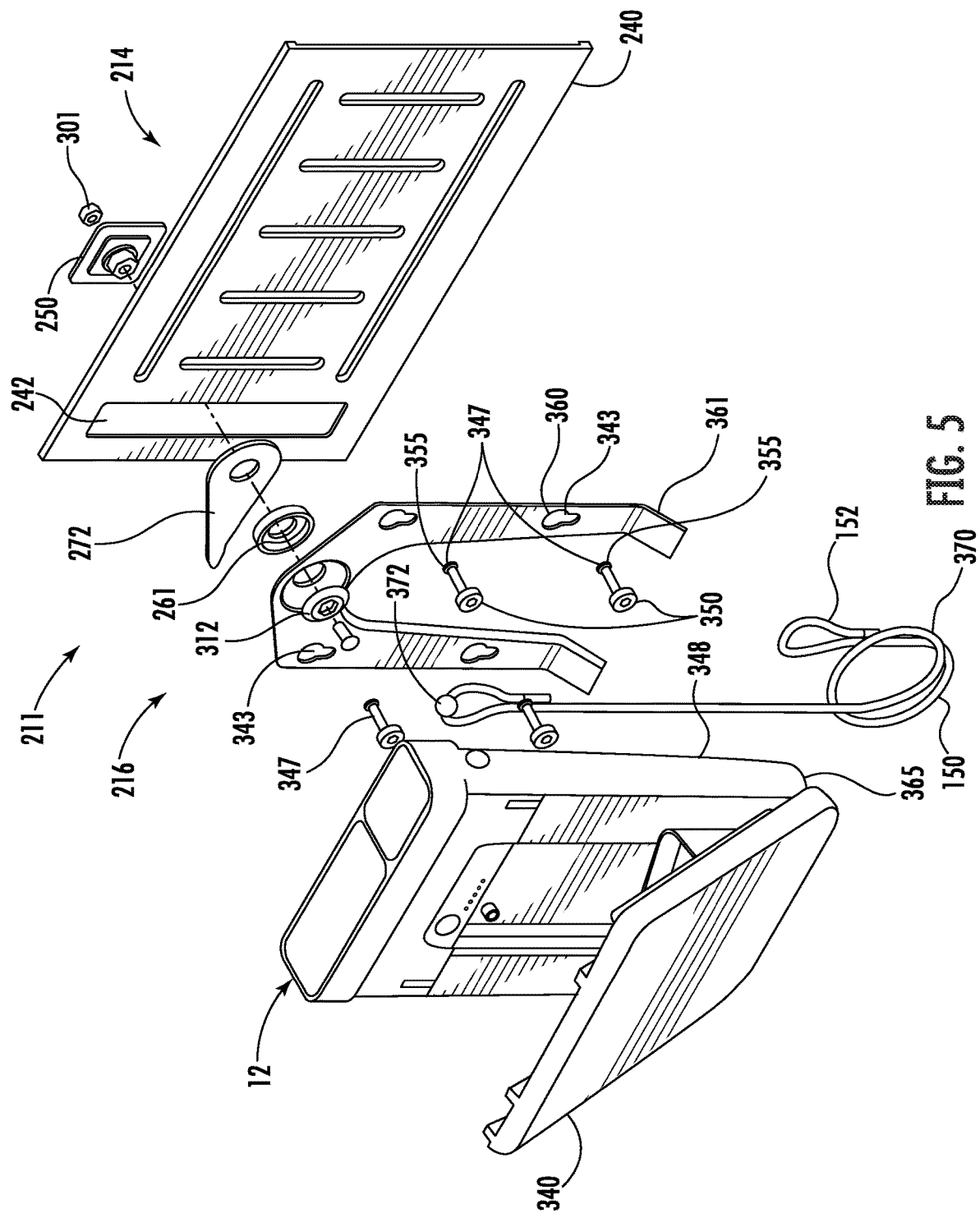
FIG. 5 is an exploded perspective view of a second embodiment of the securement device that allows for rotational and elevational position adjustment.
Figure 6:
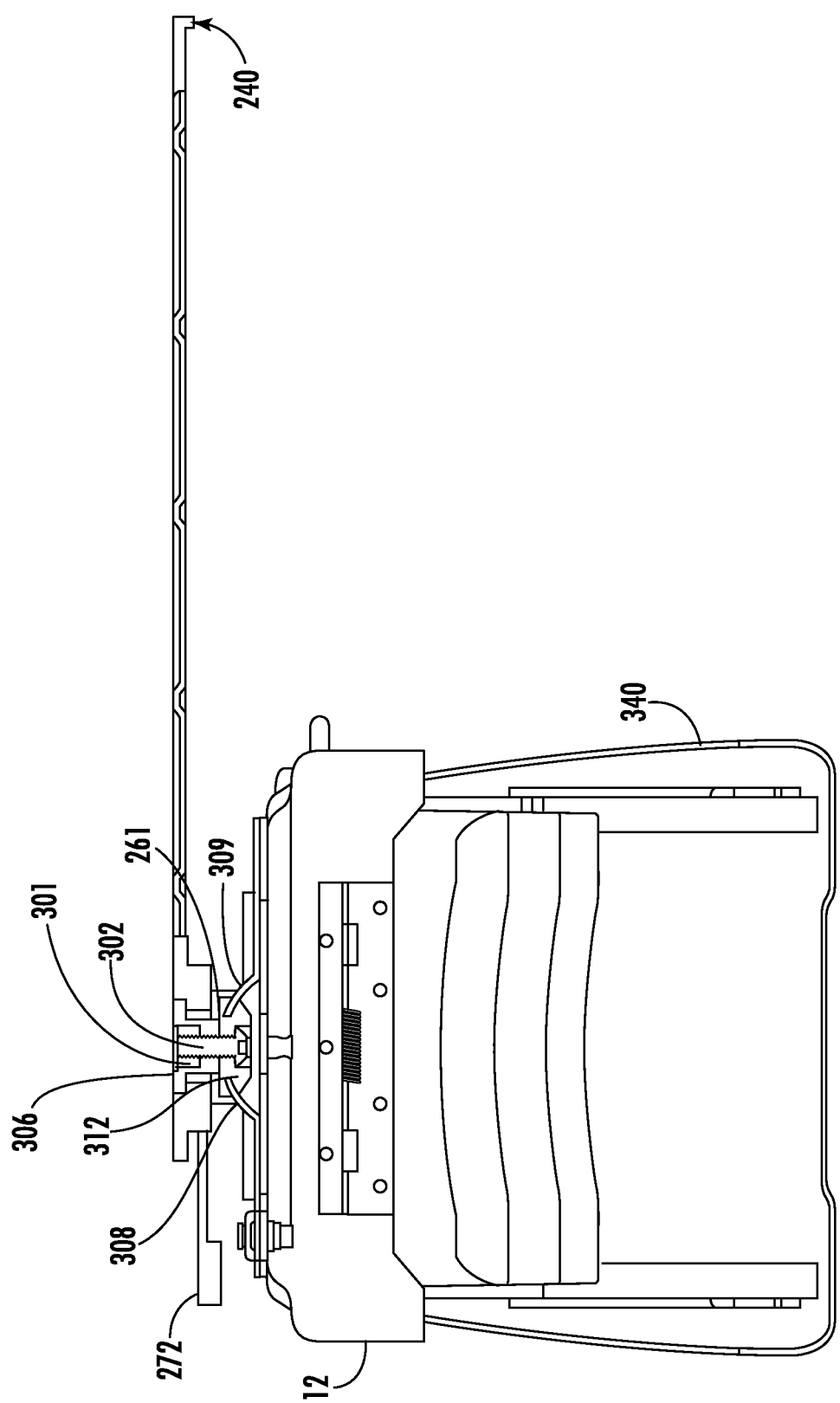
FIG. 6 is a top plan view of portions of the securement device showing the firearm retainer in an open position.

The coupler 300 is configured for mounting of the retainer 12 to the attachment device 216, and hence the mounting plate 240. As best seen in FIG. 5, the retainer 12 has means for mounting the retainer 12 to the coupler 300 on the side 348 opposite its door 340. In a preferred embodiment, each of the legs 305 are provided with at least one, and preferably a plurality of, through holes 343, each being configured to receive a suitable fastener therethrough. In the illustrated structure, a plurality of fasteners 347 is secured to the firearm retainer 12 on the wall 348 opposite the door 340. The fasteners 347 each have a spacer 350 mounted thereon that are sized and shaped to provide a gap between the outer face of the spacer 350 and the inner face of a head 355 on each of the fasteners 347. The size of the head 355 is such as to be received through the large end 360 of a hole 343, while being too large to pass through the small end 362 of a respective hole 343. The type of hole 343 illustrated is often called a keyhole. The spacers 350 also position the coupler 300 from the wall 348. In a preferred embodiment, each of the legs 305 are provided at their free end with a foot 361 that is positioned and directed to be positioned under a bottom wall 365 of the retainer 12. Although a plurality of feet 361 are shown, only one embodiment is illustrated. As illustrated, two spaced apart feet 361 are utilized in the illustrated embodiment. The door 340 is hingedly mounted to the retainer at a position adjacent the bottom wall 365. In use, the feet 361 will engage an underlying surface before the wall 365 does and prevent upward movement of the retainer 12 relative to the coupler 300. It is to be understood that while the retainer 12 is described as being configured for firearm storage, it can be configured for secure storage of other items. The feet 361 extend from an inner surface of wall 348 of the retainer 12 toward an outer surface of the door 340 and have a support surface engaging portion 363 extending beyond a center of gravity of the retainer. As shown, the feet 361 incline downwardly from the wall 348 toward the door 340.

The securement device 211, as illustrated in FIG. 5, can be provided with an antitheft attachment device 370 similar to the above described device 148. The device 370 is in the form of a tether and can be provided with an end loop 152 and a cable 150 as described above. In the illustrated device 370, the device is removable from the retainer 12, such as by providing a connector attachment device 372 that has a T-shaped head that can be fitted in a slot in one of the walls of the retainer 12, as disclosed in U.S. Pat. Nos. D786,047 and D786,046, and U.S. patent application Ser. No. 15/970, 448, the disclosure of which relating to such a device is incorporated herein by reference.

Figure 10:
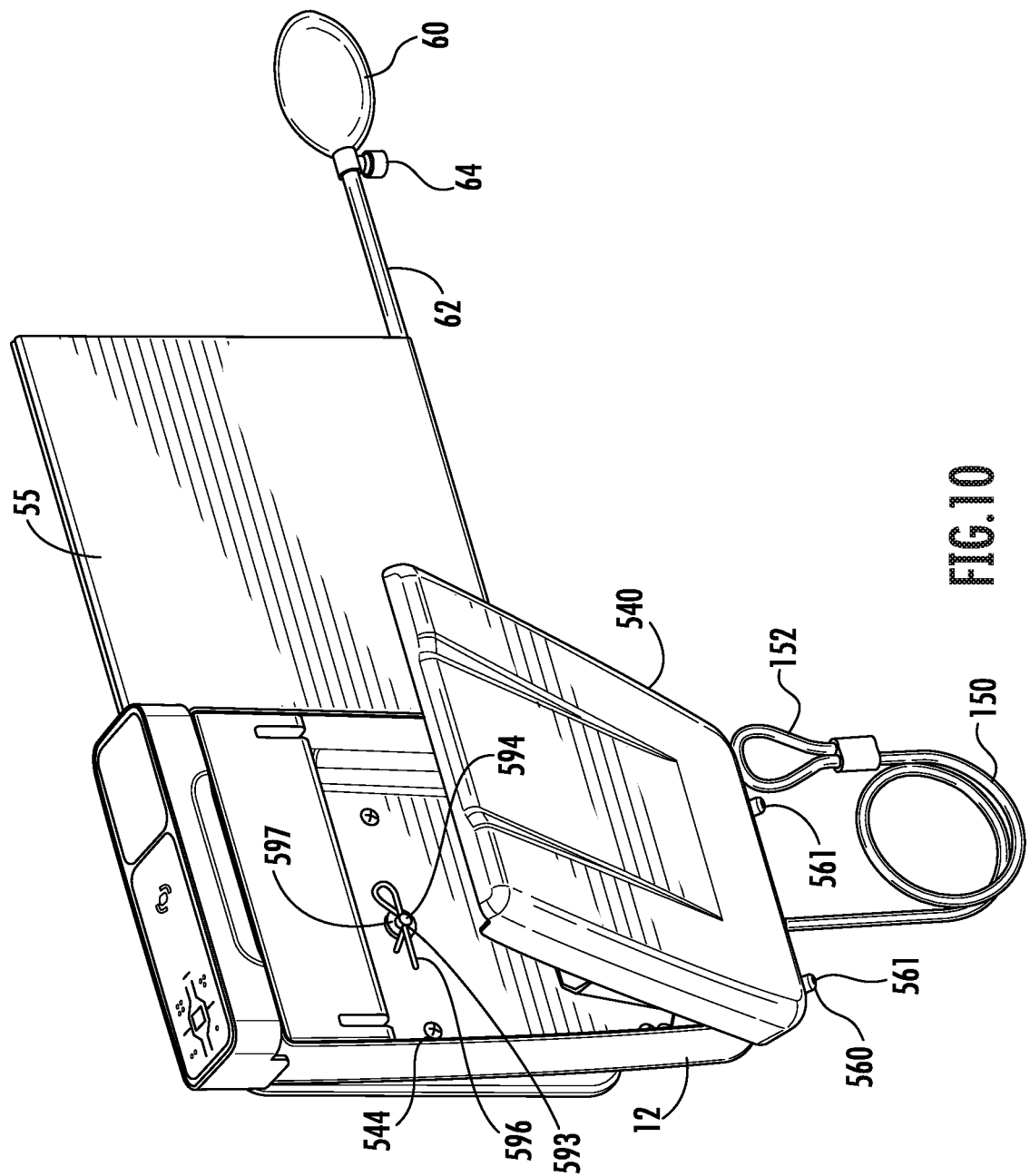
FIG. 10 is a perspective view of a third embodiment of the securement device with a door in an open position.
Figure 11:
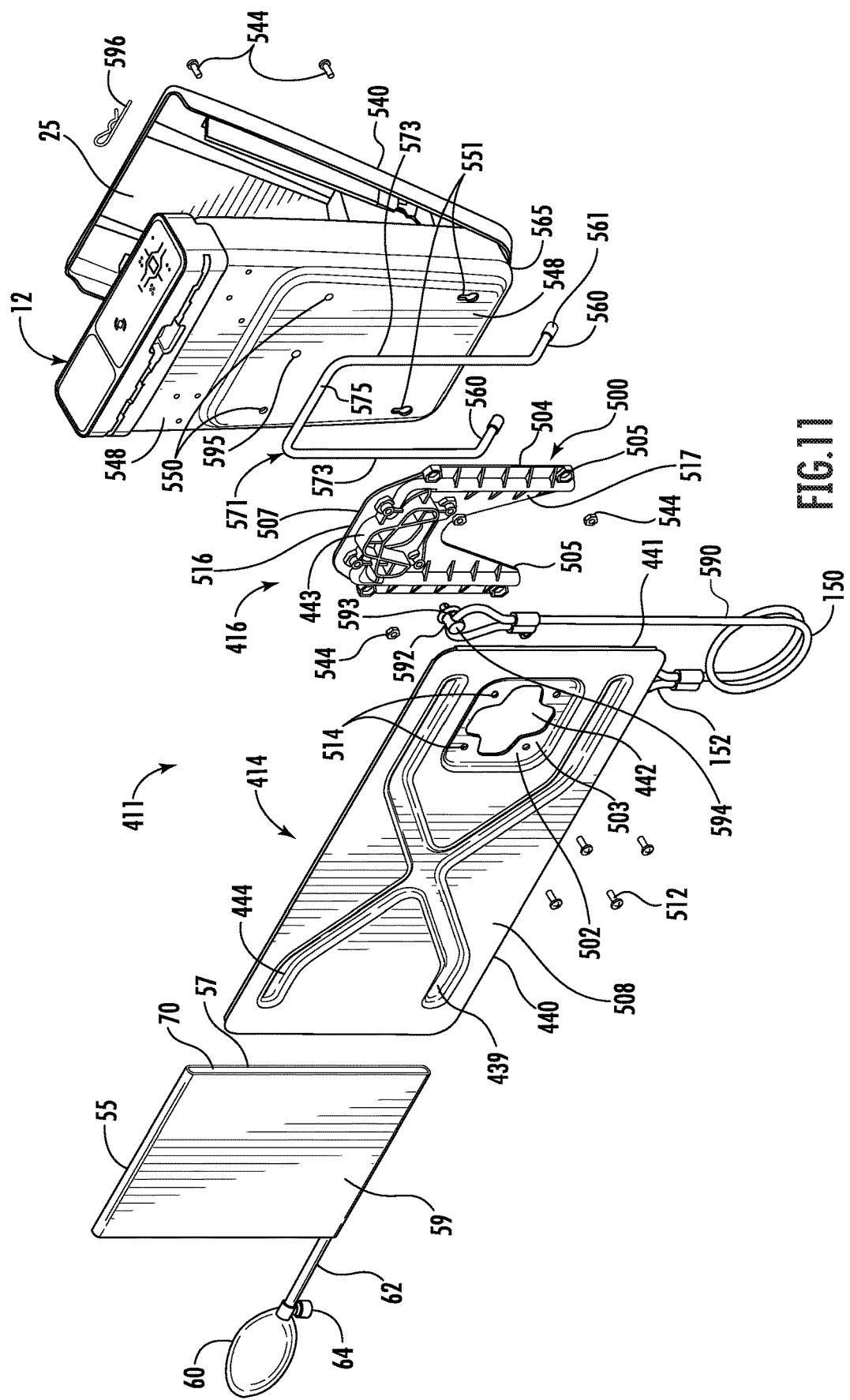
FIG. 11 is an exploded perspective view of the third embodiment of the securement device.
Figure 12:
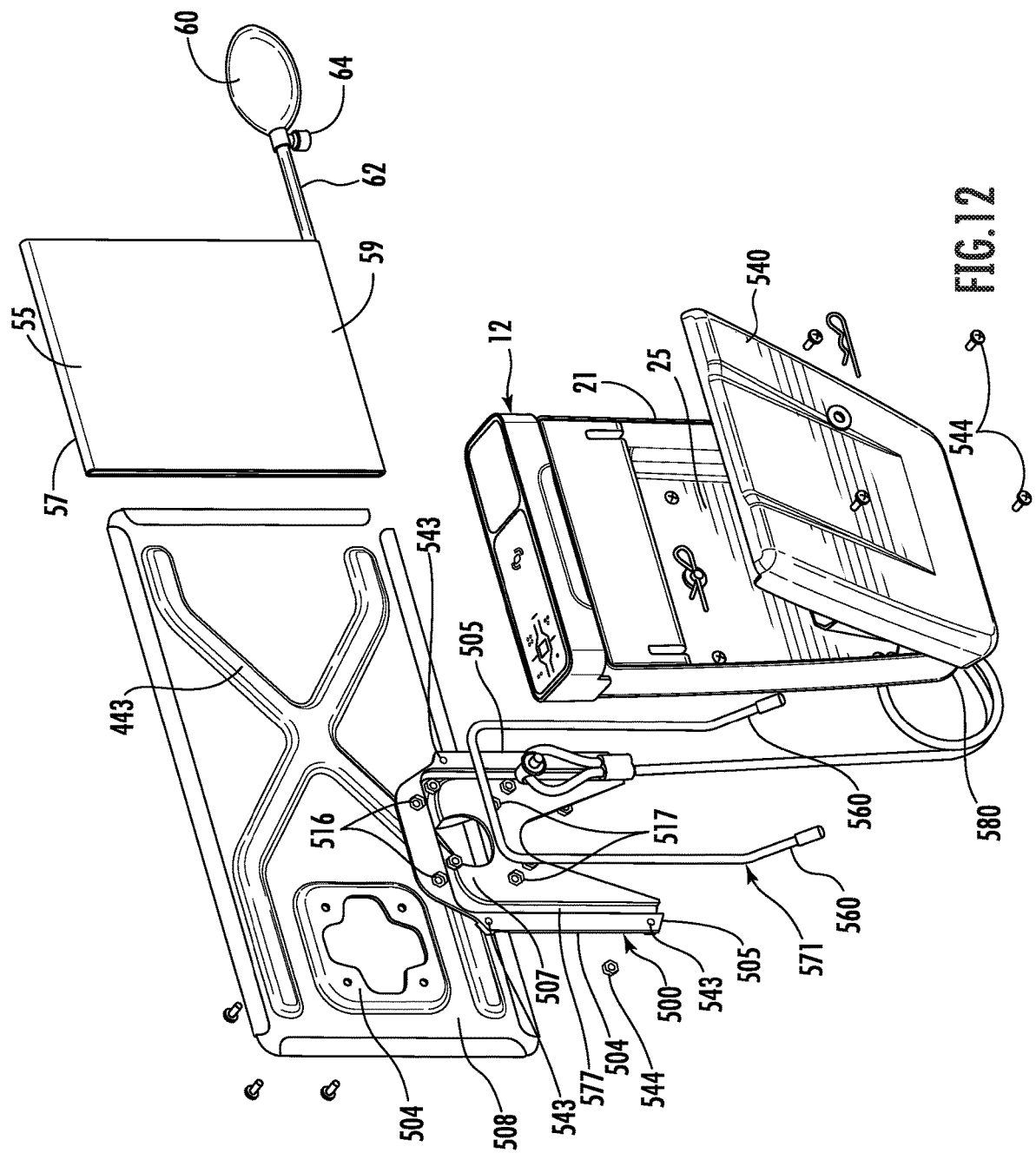
FIG. 12 is an exploded perspective view of the third embodiment of the securement device but viewed from the opposite side as seen in FIG. 11.

FIGS. 10, 11 and 12 illustrate a third embodiment of the present invention. It is simpler in form than the first two embodiments, but maintains the mounting structure using the inflatable pillow 55 and associated mounting plate.

The reference numeral 411 represents, generally, the third embodiment of the securement device for use in vehicles. The securement device 411 is operable to mount a retainer, such as a firearm retainer, designated generally 12, within the vehicle, to allow it to be positioned at various orientations and various locations within the vehicle, and to allow for its easy removal by an authorized person. The firearm retainer 12 is described above. The securement device 411 includes a mounting device 414 that can be coupled to the retainer 12, which allows mounting of the securement device within the vehicle in a releasable manner. Except as noted below, the mounting device 414 is generally similar to the mounting devices 14 and 214 described above. The securement device 411 also includes an attachment device 416 coupled to the retainer 12 and operable to effect attachment of the retainer 12 in a semi-permanent, and preferably theft resistant, manner to the vehicle. The attachment device 416 is operable to mount the retainer 12 to the mounting device 414. The attachment device 416 can be configured to allow for adjusting the orientation of the retainer 12 to both the mounting device 414 and the vehicle as described herein. The securement device 411 includes both the mounting device 414 and attachment device 416.

The mounting device 414 includes a pillow 55, tube 62, valve 64, and pump 60 as described above. The pillow 55 includes inflatable sides 57, 59. The pillow 55 and its associated parts, as described below, are generally as described above. While the pillow 55 is shown as having two inflatable sides 57, 59, it is to be understood that a single inflatable side can be used. As best seen in FIG. 11, the inflatable sides 57, 59 are part of a sleeve 70 that is received over a mounting plate 440, which is preferably rigid. The mounting plate 440 can be metal or polymeric and can be pressed or molded to provide ribs 439 raised to increase rigidity and, preferably, corresponding grooves 444 on the opposite side of the mounting plate 440. The ribs 439 help retain the pillow 55 in a selected longitudinal position relative to the mounting plate 440. A cover 67 (not shown in FIGS. 10, 11), as described above, can also be provided for protection of the mounting plate 40 and the surrounding portions of a car or vehicle interior. It is to be noted that the mounting plate 440 is received within the sleeve 70 and can have its longitudinal position relative to the pillow 55 adjustable and held in place by air pressure when the pillow 55 is inflated. This provides a first positional adjustment for the retainer 12 in a rearward or forward direction when mounted generally horizontally or up and down if mounted generally vertically. The mounting plate 440 has a free and exposed end portion 441. The mounting plate 440 has a through opening 442 that can be shaped to correspond to the shape of a projecting wall structure 443 on coupler 500 to help align the mounting plate 440 to the attachment device 416.

Details of the attachment device 416 are shown in FIGS. 11, 12. The attachment device 416 is operable to allow mounting of the retainer 12 to the mounting device 414 in a manner that allows for rotational movement of the retainer 12 relative to the mounting device 414, and hence the vehicle in which it is mounted, and releasably fix the retainer 12 in a desired position and orientation. As shown, the attachment device 416 includes a coupler 500. The coupler 500 includes the projecting wall structure 443. In a preferred embodiment, the coupler 500 and mounting plate 440 are separate parts secured together. When secured together, the wall structure 443 projects through the opening 442 and their shapes are such as to limit rotation of the coupler 500 relative to the mounting plate 440. In the illustrated structure, the opening 442 and wall structure 443 have interfering edges in a + shape to prevent relative rotation. As shown, the opening 442 is through a portion 502 of the mounting plate 440 that is raised on one side 503 relative to a main planar portion 508 of the mounting plate 440 and recessed 504 on the other side. The ribs 439 and portion 504 can be press formed and the opening can be punch formed. The coupler 500 is suitably secured to the mounting plate 440 mechanically, as with a plurality of threaded fasteners 512, such as a bolt and nut combination. The bolt portions can each extend through a respective through hole 514 in the mounting plate 440 and a respective through hole 516 in the coupler 500. The nut side of the coupler 500 at each hole 516 can have a nut receiving pocket 517 corresponding to the nut shape, such as hex, to assist in preventing nut rotation during fastener 512 tightening. As shown, there are four holes 514, 516 in each of the mounting plate 440 and coupler 500, allowing for four different rotational positions of the coupler 500 relative to the mounting plate 440. It is to be noted that any suitable number of such holes can be in either or both the coupler 500 and the mounting plate 440 to provide more or less rotational positions.

The coupler 500 is configured to mount the firearm retainer 12 to the mounting plate 440. The mounting can be permanent or removable as desired, with removable being preferred. As shown, the mounting is removable and allows for positionable adjustment of the retainer 12. The coupler 500 includes a plate 504 that can be generally U-shaped having a pair of spaced apart legs 505 and bight 507 connected to and extending between the legs 505. Preferably, the legs 505 and bight 507 are an integral structure and can be made of stamped or molded metal or molded of a polymeric material as with the above described couplers.

The coupler 500 is configured for mounting of the retainer 12 to the attachment device 416, and hence the mounting plate 440. As best seen in FIGS. 11, 12, the retainer 12 is associated with means for mounting the retainer 12 to the coupler 500 on the wall 548 opposite its cover, lid or door 540 (similar to door 340). In a preferred embodiment, each of the legs 505 are provided with at least one, and preferably a plurality of through holes 543, each being configured to receive a suitable fastener 544, such as a threaded fastener like a nut and bolt, with the bolt therethrough. In the illustrated structure, the wall 548 has a plurality of through holes 550 and 551. They are spaced apart and positioned to correspond to the spacing and positioning of holes 543. The offside of the holes 543 adjacent the mounting plate 440 can be provided with nut receiving pockets 557, such as the pockets 517 for the same purpose. In the illustrated structure, the holes 551 can be so-called keyholes such as the holes 343 described above. There is a plurality of fasteners used to prevent rotation of the retainer 12 relative to the attachment device 416 and the mounting plate 440 when the parts are secured together.

When the four holes 550, 551 are in a square pattern, the retainer 12 can assume four different rotational positions. It is to be understood that additional holes can be provided and equally spaced apart circumferentially to provide additional rotational positions. Five holes, five positions, six holes, six positions and so on.

In a preferred embodiment, the attachment device 416 has feet 560 to provide additional support for the retainer 12. The feet 560 are part of a leg assembly 571; although, as above, they can be an integral part of the coupler 500. The feet 560, like the feet 361 described above, extend from the inner wall 548 toward the door 540, preferably past the center of gravity of the retainer 12. The feet 560 have portions 561 positioned outwardly of the center of gravity of the retainer 12 to engage an underlying support surface as described above for the feet 361. The feet 560 serve at least two functions: to space the bottom of the door 540 from an underlying surface to ensure the door will open, and to have the portions 561 positioned outward of the center of gravity of retainer 12 on the opposite side of the mounting plate 440 to reduce canting of the retainer 12 during use. The feet 560 and 361 are similar in design and function. The illustrated leg assembly 571 includes a pair of spaced apart legs 573 connected by a bight member 575. The leg assembly 571 is mounted to the coupler 500 by having the legs 573 and bight 575 received in a groove 577 in the coupler 500, and the leg assembly is captured between the coupler and the wall 548. It is to be understood that the leg assembly 571 can be adjustable to set how far the feet 561 extend below the bottom 580 of the retainer 12 for elevational positioning of the retainer 12.

The securement device 411 can be provided with an antitheft attachment device 590, similar to or the same as the above described device 148. The device 590 is in the form of a tether and can be provided with an end loop 152 and a cable 150, as described above. In the illustrated device 590, the device is removable from the retainer 12, such as by providing a connector attachment device 592 that has a post 594 sized and shaped to be received through an aperture 595 in the wall 548 or other portion of the retainer 12. A suitable fastener 596 connects the securement attachment device 590 to the retainer 12. As shown, the fastener 596 is a hairpin keeper. As shown, the post 594 has a through bore 593 adapted to releasably receive the fastener 596 therethrough. A washer 597 can also be provided to space the fastener 596 from the inner surface from engaging the fastener 596.

Orientation terms, such as inner, outer, upper and lower as used herein in the sense of when the securement device is mounted in a vehicle for normal use.

It is to be understood that while certain forms of the invention are illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A securement device for removably mounting a firearm retainer in a vehicle, the securement device including:
   a mounting device including a mounting plate, said mounting device further including a selectively inflatable pillow mounted on the plate and a pump connected in flow communication with the pillow and operable to effect at least partial inflation of the pillow, and a valve operably associated with at least one of the pillow and pump and operable to selectively release pressurized fluid from the pillow, said mounting device being adapted to removably mount the securement device in a vehicle;
   a retainer having a storage chamber adapted for selectively holding a firearm; and
   an attachment device secured to said plate, said attachment device including means for mounting said retainer to said mounting device including an elongate slot through the mounting plate and the attachment device including a slide selectively movably mounted in the slot, allowing elevational movement of the retainer relative to the mounting plate and means cooperating with the slide to releasably secure the slide in a selected position in the slot.

2. The securement device of claim 1 including means cooperating with the retainer, allowing rotational movement of the retainer relative to the mounting device.

3. The securement device of claim 2 wherein the means including a ball joint allowing selective multi axis movement of the retainer relative to the mounting device.

4. The securement device of claim 1 including an actuator rotatably mounted on said slide and a tightening element operably associated with said slide and said actuator operable to releasably fix the slide against movement relative to said mounting plate.

5. The securement device of claim 4 wherein one of said tightening element and said actuator including at least one cam surface and the other of said tightening element and said actuator having at least one cam follower, whereby relative rotation of said actuator relative to said tightening element selectively effecting securement of the attachment device against movement relative to said mounting plate and release of said securement.

6. The securement device of claim 5 wherein said tightening element and said slide are fixed against rotation relative to one another.

7. The securement device of claim 6 wherein said actuator is positioned between said mounting plate and said tightening element.

8. The securement device of claim 4 wherein said slide is fixed against rotation relative to said mounting plate.

9. The securement device of claim 2 wherein the attachment device including a coupler operably associated with the mounting plate, said retainer being secured to the coupler with a plurality of fasteners and the coupler and the retainer each having a plurality of fastener receiving holes, whereby the holes are configured to allow securing the retainer to the coupler in a selected rotational position of a plurality of available rotational positions.

10. The securement device of claim 1 including a tether releasably secured to said firearm retainer.

11. The securement device of claim 1 wherein said pillow having an expandable portion on each side of the mounting plate and laterally expandable in response to inflation thereof.

12. The securement device of claim 1 including at least one foot adjacent a lower portion of the retainer and extending from an inner surface of the retainer toward an outer surface of the retainer and having a support surface engaging portion extending beyond a center of gravity of the retainer.

* * * * *